(12) United States Patent
Mandalia et al.

(10) Patent No.: US 9,635,438 B2
(45) Date of Patent: Apr. 25, 2017

(54) PROVIDING SECONDARY CONTENT TO ACCOMPANY A PRIMARY CONTENT ITEM

(71) Applicant: GENERAL INSTRUMENT CORPORATION, Horsham, PA (US)

(72) Inventors: Hiren M. Mandalia, Schaumburg, IL (US); Mir F. Ali, Rolling Meadows, IL (US); Santosh S. Basapur, Hanover Park, IL (US); Anthony J. Braskich, Palatine, IL (US); Paul C. Davis, Arlington Heights, IL (US); Faisal Ishtiaq, Chicago, IL (US); Crysta J. Metcalf, Cary, IL (US); Ashley B. Novak, Chicago, IL (US); Loren J. Rittle, Lake Zurich, IL (US); Dale W. Russell, Palatine, IL (US); James R. Talley, Austin, TX (US); Narayanan Venkitaraman, Palatine, IL (US)

(73) Assignee: ARRIS Enterprises, Inc., Suwanee, GA (US)

( * ) Notice: Subject to any disclaimer, the term of this patent is extended or adjusted under 35 U.S.C. 154(b) by 0 days.

(21) Appl. No.: 13/628,161

(22) Filed: Sep. 27, 2012

(65) Prior Publication Data

US 2014/0089967 A1 Mar. 27, 2014

(51) Int. Cl.
*G06F 3/00* (2006.01)
*H04N 21/81* (2011.01)
(Continued)

(52) U.S. Cl.
CPC ....... *H04N 21/8133* (2013.01); *H04N 21/235* (2013.01); *H04N 21/25883* (2013.01);
(Continued)

(58) Field of Classification Search
USPC .................................................. 725/37–61
See application file for complete search history.

(56) References Cited

U.S. PATENT DOCUMENTS 6,751,776 B1 6/2004 Gong
7,050,603 B2 5/2006 Rhoads et al.
(Continued)

FOREIGN PATENT DOCUMENTS

EP 2501144 A2 9/2012
WO 2009075915 A1 6/2009
(Continued)

OTHER PUBLICATIONS

Caulfield, M. et al.: "Content Distribution Network Interconnection (CDNI) Core Metadata draft-caulfield-cdni-metadata-core-00", Network Working Group, Cisco Oct. 24, 2011, Expires, Apr. 26, 2012, all pages.
(Continued)

*Primary Examiner* — Nathan Flynn
*Assistant Examiner* — Michael Telan
(74) *Attorney, Agent, or Firm* — Stewart M. Wiener (57) ABSTRACT

While a user views a primary content item (for example, a movie on a television screen), secondary content items are selected and presented to the user, either on the same screen or on a screen of the user's companion device. To choose selections that are relevant to the user's current interests, the selection process considers information beyond the realm of primary and secondary content. Over time, the selection process learns to make more relevant selections by monitoring selection choices made by other systems.

28 Claims, 4 Drawing Sheets

(51) Int. Cl.
| | |
|---|---|
| H04N 21/235 | (2011.01) |
| H04N 21/258 | (2011.01) |
| H04N 21/2665 | (2011.01) |
| H04N 21/41 | (2011.01) |
| H04N 21/435 | (2011.01) |
| H04N 21/658 | (2011.01) |
| H04N 21/84 | (2011.01) |

(52) U.S. Cl.
CPC ... *H04N 21/25891* (2013.01); *H04N 21/2665* (2013.01); *H04N 21/4126* (2013.01); *H04N 21/435* (2013.01); *H04N 21/6582* (2013.01); *H04N 21/84* (2013.01)

(56) References Cited

U.S. PATENT DOCUMENTS

| | | | |
|---|---|---|---|
| 7,194,235 | B2 | 3/2007 | Nykanen et al. |
| 7,519,618 | B2 | 4/2009 | Nagahashi et al. |
| 7,735,101 | B2 | 6/2010 | Lanza et al. |
| 7,899,915 | B2 | 3/2011 | Reisman |
| 7,921,116 | B2 | 4/2011 | Finkelstein et al. |
| 8,037,496 | B1 | 10/2011 | Begeja et al. |
| 8,046,689 | B2 | 10/2011 | Naik et al. |
| 2002/0144291 | A1 | 10/2002 | Smiley et al. |
| 2003/0093793 | A1* | 5/2003 | Gutta ............................. 725/46 |
| 2003/0182663 | A1 | 9/2003 | Gudorf et al. |
| 2007/0250901 | A1 | 10/2007 | McIntire et al. |
| 2008/0313146 | A1 | 12/2008 | Wong et al. |
| 2009/0064247 | A1 | 3/2009 | Biniak et al. |
| 2009/0193457 | A1* | 7/2009 | Conn ............................. 725/34 |
| 2010/0043040 | A1 | 2/2010 | Olsen, Jr. |
| 2010/0058390 | A1 | 3/2010 | Harris et al. |
| 2010/0205628 | A1 | 8/2010 | Davis et al. |
| 2010/0241699 | A1 | 9/2010 | Muthukumarasamy |
| 2010/0251305 | A1* | 9/2010 | Kimble et al. .................. 725/46 |
| 2010/0280641 | A1 | 11/2010 | Harkness et al. |
| 2010/0293575 | A1 | 11/2010 | Biniak |
| 2011/0041080 | A1 | 2/2011 | Fleischman et al. |
| 2011/0063503 | A1 | 3/2011 | Brand et al. |
| 2012/0208592 | A1 | 8/2012 | Davis et al. |

FOREIGN PATENT DOCUMENTS

| | | |
|---|---|---|
| WO | 2011/053271 A1 | 5/2011 |
| WO | 2011/106087 A1 | 9/2011 |

OTHER PUBLICATIONS

Cocomore, Multilingual Web Conference, CMS and localisation, Multilingual Web content management, Limerick, Sep. 21, 2011, all pages.

Weisz, Justin D. et al.: "Watching together: integrating text chat with video", published in Proceeding CHI '07 Proceedings of the SIGCHI conference on Human factors in computing systems, ACM, New York, NY, 2007, pp. 877-886.

Moveey,com, what you need, when you need it, Sep. 24, 2012, http://www.moveey.com.

YouTube Video Annotations, http://www.yutube.com/t/annotations_about, downloaded from Internet: Sep. 24, 2012, all pages.

Vidispine—Search down to single frames. Fast. Smart., http://www.vidispin.com/Advance_search_and_Metadata, downloaded from internet Sep. 21, 2012, all pages.

CCExtractor, A free, GPL Licensed closed caption tool, Current Version 0.63, Aug. 17, 2012, About CCExtractor, downloaded from internet: http://ccextractor. sourceforge.net, all pages.

Chapter 3. Advanced streaming using the command line, http://www.videolan.org/doc/streaming-howto/en/ch03.html, downloaded from internet: Sep. 26, 2012, all pages.

VH1 Co-Star for iPhone, iPod touch, and iPad on the iTunes App Store, VH1 Co-Star, by MTV Networks, http://itunes.apple.com/us/app/vh1-co-star/id413522634?mt=8, downloaded from internet: Sep. 26, 2012, all pages.

Social TV Analytics: Bluefin Labs, Social TV analytics, http://bluefinlabs.com/, downloaded from Internet: Sep. 26, 2012, all pages.

Los Angeles Times: Business, Technology, The Business and Culture of Our Digital Lives, From the L.A. Times: ClipSync and the wisdom of the peanut gallery, Mar. 5, 2010, all pages.

Christina Warren: "Umami for iPad: The Ultimate TV Companion Knows What You're Watching", Mashable Tech, Nov. 8, 2011, http://mashable.com/2011/11/08/Umami-ipad-app/, all pages.

Richard Lawler: "Panasonic's new Social TV App puts Twitter and Facebook next to your TV shows", engadgetHD, http://www.engadget.com/2011/11/06/panasonics-new-social-tv-app-puts-twitter-and-facebook-next-to/, Nov. 6, 2011, all pages.

Harry MCracken: "Yahoo's IntoNow: Interactive TV, but not on TV", Nov. 6, 2011, cnet, http://news.cnet.com/8301-33200_3-57319265-290/yahoos-intonow-interactive-tv-but-now-on-tv/, all pages.

Natan Edelsburg: "Exclusive: Yap.TV launches in 20 countries, 5 languages", Aug. 21, 2012, http://www.lostremote.com/2012/08/21/exclusive-yap-tv-launches-globally-in-twenty-countries-five-languages, all pages.

PCT Search Report and Written Opinion, RE: Application No. PCT/US2013/062237; dated Dec. 3, 2013.

Official Action, RE: Korean Application No. 10-2015-7007632, dated Mar. 18, 2016.

Official Action, RE: Mexican Application No. MX/a/2015/004004, dated Mar. 18, 2016.

Official Action, RE: Canadian Application No. 2,885,310, dated Apr. 12, 2016.

Official Action, RE: Mexican Application No. MX/a/2015/004004, dated Jul. 18, 2016.

* cited by examiner

PROVIDING SECONDARY CONTENT TO ACCOMPANY A PRIMARY CONTENT ITEM

TECHNICAL FIELD

The present invention is related generally to computer communications and, more particularly, to digital television.

BACKGROUND

As personal communications devices (e.g., smartphones) are developed to support greater and greater functionality, people are using them to do much more than talk. As is well known, these devices now usually allow their users to create media files (e.g., by taking a picture or by recording a video using a camera on the device), to download media files from remote servers (via a web interface supported by the device), and to access interactive applications.

However, even as people spend more time online, traditional media remain very important. Indeed, rather than simply replacing traditional media time with online time, many people (more than 30% of television viewers as of mid-2012, according to survey data) are beginning to "multi-task," that is, to combine traditional and new media. For example, while a user watches television, his personal communications device becomes a "companion device" displaying content often, but not always, related to the content shown on the television. This user may engage in an interactive application (e.g., check his e-mail) on the companion device while at the same time remaining at least peripherally aware of the content that the television is displaying.

Today there are several products that allow television viewers to consume and to create secondary content that is related to the television program that they are watching. A service produces a synchronized feed of television programming and related web articles, websites, tidbits, etc., for display on a companion device (or on a second window on the television screen). The feed is generated automatically using some preliminary analysis of closed-caption text and television-programming information (e.g., information from an electronic program guide). Other products allow users to enter comments at specific points within a TV program. These comments are then presented to other users when they are watching the same program.

However, it is often very difficult to find secondary content that is relevant to the current interests of the TV viewers. One reasons for this is that users often discuss topics that are tangential to the content of the TV show, that is, that have only a second degree of connection to the TV content. For example, in a sports game, users may chat about the girlfriend of one of the players, although there is no mention of the girlfriend in the closed-caption text or in the other programming information available to the system that produces the secondary-content feed.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

While a user views a primary content item (for example, a movie on a television screen), secondary content items are selected and presented to the user, either on the same screen or on a screen of the user's companion device. To choose selections that are relevant to the user's current interests, the selection process considers information beyond the realm of primary and secondary content. Over time, the selection process learns to make more relevant selections by monitoring selection choices made by other systems.

Figure 1:
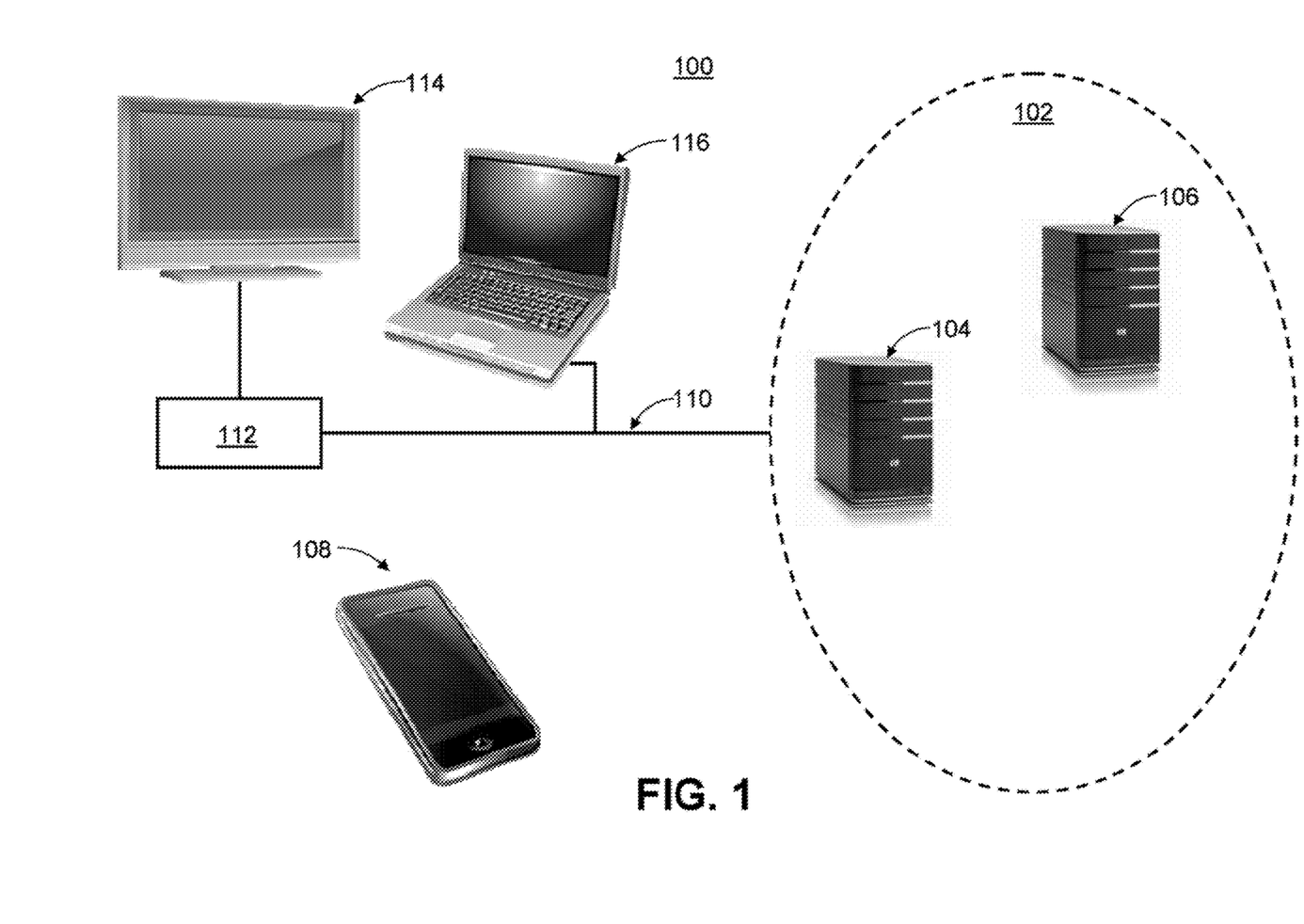
FIG. 1 is an overview of a representative environment in which the present techniques may be practiced.

To understand this more fully, first consider the representative communications environment 100 of FIG. 1. Connected together via any or all of various known networking technologies 102 are media-content servers 104 (e.g., television programming servers, web servers, and the like) and content-selection servers 106. (The functions of these servers 104, 106 are discussed below.) Some of the media-content servers 104 may head-end a cable-television delivery system 110. For ease of illustration, only two servers 104, 106 are shown, but numerous servers 104, 106 can exist and can work together, as discussed below.

Head-end servers 104 provide, via the networking technologies 102, media-download and television services to end-user devices. Non-wireless end-user devices are supported by "wireline" network technologies (e.g., fiber, wire, and cable) 110. For example, a set-top box 112 generally receives television programming from a head-end server 104 and provides a user interface (e.g., an interactive program guide) for selecting and viewing content from the head-end server 104. A digital video recorder (not shown) can store programming for later viewing. The video content may be viewed on a television monitor 114. In some situations, a laptop computer 116 accesses web-based services either wirelessly or via the wireline network 110. A gaming console, home gateway, kiosk, digital sign, or media-restreaming device (not shown) are other possible end-user devices. Options for connecting these devices and services are well known in the art and need not be further discussed.

(A media-restreaming device transfers content between disparate types of networks. For example, it receives content from the cable system 110 and then transmits that content over a local radio link such as WiFi to a smartphone 108. The media-restreaming device usually operates in both directions to carry messages between the networks. In some embodiments, aspects of the present invention are practiced by a media-restreaming device.)

Television programming (and other media content) can also be delivered to non-traditional subscriber devices such as the smartphone 108. This smartphone 108 communicates wirelessly to a wireless base station (not shown but known in the art) to access the public switched telephone network, the Internet, or other networks to access web-based services as well as the television-delivery services provided by the media-content providers 104.

Wireless and wireline network technologies generally support two-way traffic: Media content and related information are delivered to the end-user devices 108, 112, 114, and 116, and requests and other information go "up" to the servers 104, 106.

Next consider a user, in the communications environment 100 of FIG. 1, watching a television program on the television monitor 114. (The television program is often called a "primary content item" in the present discussion.) To enhance the user's experience, other content, in some manner related to the television program, is presented to the user. (This other content consists of "secondary content items.") For example, when a baseball batter approaches the plate, a display of his recent batting statistics could be retrieved from the web and presented to the user. By finding and presenting the secondary content automatically, the user's viewing of the primary content item is enhanced without forcing him to remove his attention from the primary content item in order to search for secondary content items.

To find relevant secondary content items, a "secondary content-selection process" analyzes the television program (possibly before the program is delivered to the user or possibly in real time) for topics that may be of interest to the user. For example, the process may look at closed-caption text associated with the primary content item to know who will bat next, or it may analyze the video or accompanying audio itself to find topics related to the primary content. The topics can then be used as search terms for finding secondary content on websites.

Once the relevant secondary content items are found, they can be presented to the user either on a window (or "picture-in-picture") on the television monitor 114 or on a companion device that the user has with him, such as the smartphone 108, the laptop 116, a tablet computer, etc. Examples in the present discussion usually assume that the user is watching a primary content item on the television monitor 114 and possibly interacting with it through the set-top box 112. At least occasionally, some of the user's attention is also given to secondary content items displayed on his smartphone 108.

Particular aspects of the secondary content-selection process are discussed below in conjunction with FIGS. 3 and 4.

Figure 2:
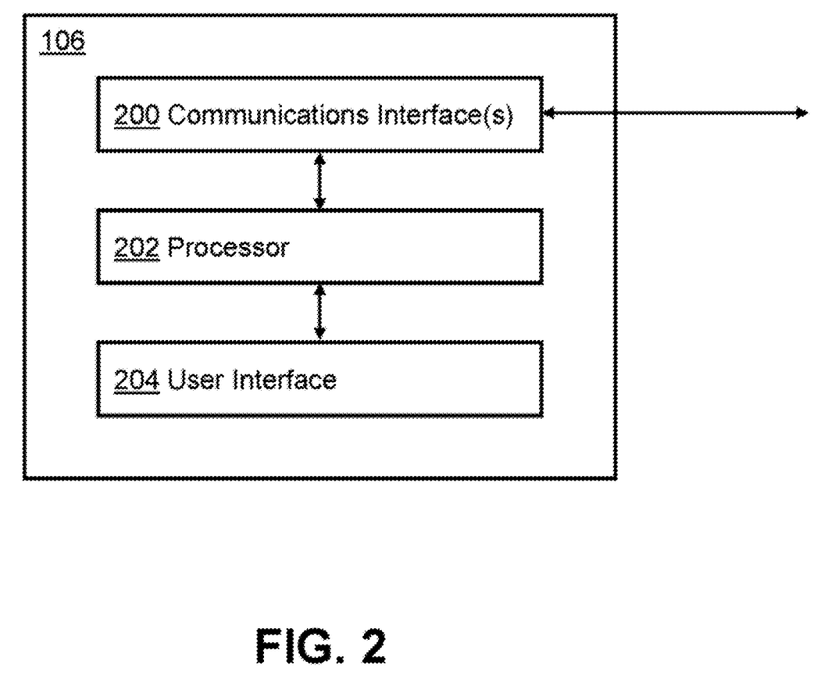
FIG. 2 is a generalized schematic of the content-selection server shown in FIG. 1.

FIG. 2 shows the major components of a representative content-selection server 106. Communications interfaces (also called transceivers) 200 send and receive primary and secondary content items, related information, and download requests. A processor 202 controls the operations of the device and, in particular, supports aspects of the present invention as illustrated in FIG. 3, discussed below. The user interface 204 supports a user's (or administrator's) interactions with the device. Specific uses of these components by specific devices are discussed as appropriate below.

Figure 3:
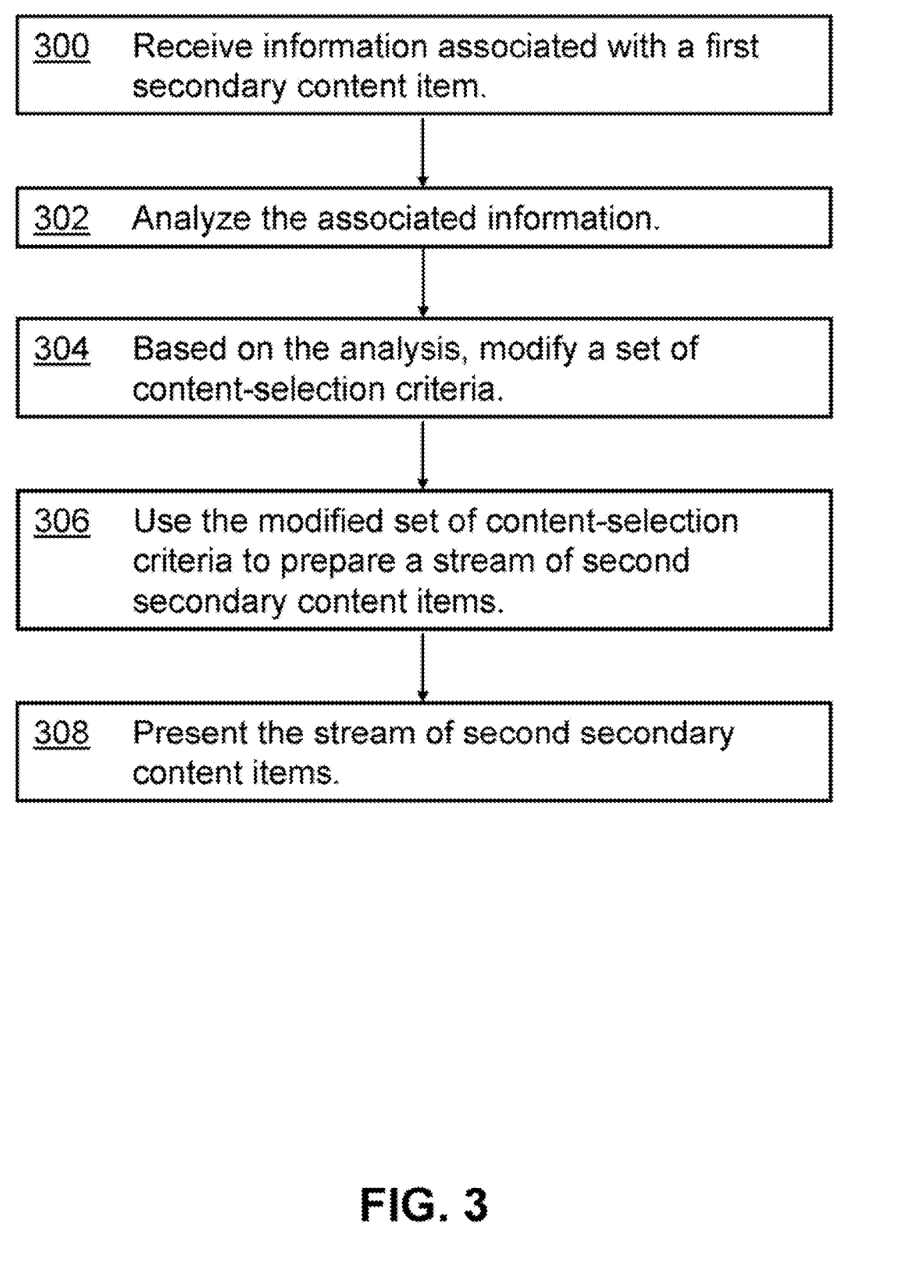
FIG. 3 is a flowchart of a representative method for selecting and providing secondary content.
Figure 4:
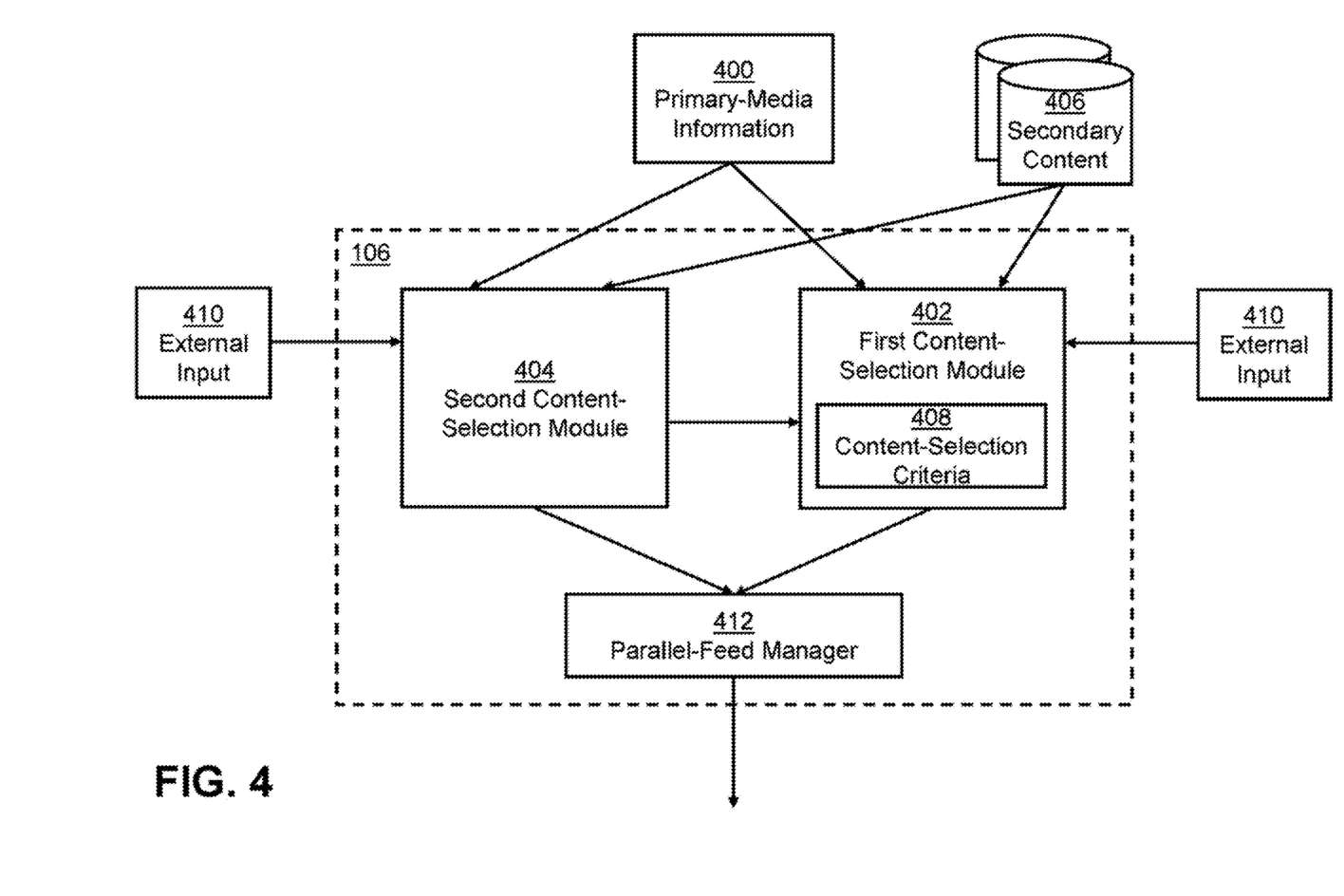
FIG. 4 is a dataflow diagram of a representative content-selection server.

FIGS. 3 and 4 help illustrate specific techniques for selecting and presenting relevant secondary content to a user. The present discussion proceeds along the lines of the representative method shown in the flowchart of FIG. 3 and refers to the representative dataflows of FIG. 4.

Before turning to FIG. 3, consider the dataflow on the left side of FIG. 4, the dataflow from boxes 400 to 404 to 412. As discussed above in reference to FIG. 1, consider a user viewing a primary media content item (e.g., he is watching a movie on the television monitor 114). Information 400 that characterizes that primary content item (which information could include, for example, an electronic program guide listing for the item or the entire item itself) is reviewed by the second content-selection module 404 which is part of the content-selection server 106.

The second content-selection module 404 reviews the primary-media information 400 in any number of ways. In addition to reading the closed-caption information, the video images can be analyzed to uncover themes, topics, and which characters appear in which scenes. The sentiment of each segment of the primary content item can be determined by analyzing the images and the accompanying audio. Other possible analytic tools, known in the art, can also be used.

In addition to the information gleaned by the analysis of the primary-media information 400, the second content-selection module 404 can access external input 410. Here, "external" means external to the primary content item and its closely associated metadata. One possible source of such external information 410 is social-networking data, such as viewer comments posted during a live broadcast of the primary content item. These posts can reveal topics that are interesting to the viewers, even if those topics are only indirectly related to the contents of the primary content item. For example, viewers may discuss a famous girlfriend of a soccer player while watching a soccer game. The primary-media information 400 may not mention that girlfriend (or even this particular soccer player if he is not playing in this game), but because she is of such interest to the viewers, the second content-selection module 404 can make better secondary content selections by accounting for this interest.

Another useful external input 410 is historical and other profile information gathered about this particular viewer. It may be known that while this user watches auto racing, he is not particularly interested in cars, and the second content-selection module 404 can take this into account when doing its selection.

As a third and final example of external input 410, the second content-selection module 404 can use the results of its analysis to prepare a search of Internet content that it believes may be of interest to its user.

Many other types of external input 410 are known and can be used by the second content-selection module 404 during its selection process.

The second content-selection module 404 analyzes whatever information it has been able to gather and, based on the results of the analysis, retrieves secondary content 406 that could be of interest to the user while he is watching the primary content item. Retrieving could involve accessing a database of content items 406, searching the web for relevant items 406, or even retrieving items 406 from the user's digital video recorder or from another personal content store.

There are many conceivable types of secondary content items 406. A selected item 406 can be, for example, a movie, a television or radio program, a song or music video, an eBook, game display, map, a message either personal or public (e.g., an advertisement or alert), a web page, a purchase recommendation, a document, or a social-networking post.

The selected secondary content items 406 are then sent to a parallel-feed manager 412 which presents them to the user either on the user's main screen 114 or on a companion device 108. In some embodiments, secondary content items 406 are found and presented in an ongoing stream, and the user can choose to interact with some of the secondary content items 406 or simply ignore them as they are replaced by subsequent selections. Timing of the presentation of the secondary content items may be determined automatically based on what is happening within the primary content (a timeout is taken, there is an important play, etc.), on the current context of the user (in a telephone call, chatting, etc.), or on the type of secondary content being produced by the second content-selection module 404. For example, some secondary content items should be presented at a time closely synchronized with an event (or time) in the primary content. Some content items are best presented within a specified period after an event in the primary content. Some secondary content items can be presented in an overlapping fashion, while other presentations are strictly sequential.

As hinted by FIG. 4, there may be several content-selection modules working in parallel. In some embodiments, each module may have been programmed to have a specific focus, for example, one module may have a particular ability for extracting relevant social-networking posts. In some embodiments, the separate content-selection modules stream their output to the parallel-feed manager 412 which can remove duplicates, pace the stream presented to the user, and otherwise coordinate the entire output of the content-selection process.

(For the sake of simplicity, the present discussion assumes that the secondary content-selection process, with all of its content-selection modules, is fully embodied on one device, but in other embodiments this process can reside at least partially within a media-content server 104, on one or more dedicated content-selection servers 106, on an end-user device such as the smartphone 108 or set-top box 112, or on some combination of these. In particular, there is no necessity for all of the content-selection modules to be hosted on the same device. For another point, the secondary content-selection modules need not all be running at the same time. For example, the first content-selection module 402, described below with reference to FIGS. 3 and 4, may make its content selections long after, even months after, other content-selection modules have made their choices.)

The flowchart of FIG. 3 presents a representative method usable by a particular content-selection module, specifically the first content-selection module 402 on the right side of FIG. 4. In addition to its own particularities described below, this module 402 can perform all of the operations described above with reference to the second content-selection module 404. The following discussion focuses on what makes the first content-selection module 402 special.

In step 300 of FIG. 3, the first content-selection module 402 receives information about a secondary content item 406 selected by another content-selection module (e.g., by the second content-selection module 404). This information is represented by the dataflow arrow from the second content-selection module 404 to the first content-selection module 402. In some embodiments, this information can be a metadata posting, internal to the content-selection server 106, of the selections 406 made by the other content-selection modules. In other embodiments, the first content-selection module 402 intercepts the streams of selections 406 output by the other modules. In this case, the "information" about the secondary content items 406 is the secondary content items themselves. (In this embodiment, the streams of secondary content items 406 selected by the other content-selection modules flow into the first content-selection module 402, and thus there is no need for a separate dataflow from, for example, the second content-selection module 404 to the parallel-feed manager 412.)

The first content-selection module 402 analyzes, in step 302, the information about the secondary content item 406 selected by the other content-selection module. Any or all of the analysis tools mentioned above as useful in analyzing the primary content item may be used here. In essence, the first content-selection module 402 performs this analysis in order to learn something about the selection process performed by the other content-selection modules. As mentioned above, each content-selection module may have its own focus, and may apply its own techniques, for selecting secondary content 406. Content-selection modules may be provided by disparate vendors, thus making their selection processes opaque to the first content-selection module 402. By examining the output streams of these other content-selection modules, the first content-selection module 402 can learn how to improve its own selection process, so that the stream of selections 406 eventually presented to the user can be made to be more relevant.

In step 304, the first content-selection module 402 codifies its learning by modifying the set of criteria 408 that it uses when selecting secondary content 406. Different embodiments can use different sets of selection criteria 408. Some selection criteria 408 expected to be fairly common include sentiment of the secondary content item 406 as well as the item's source, author, rating, popularity, creation date, and size. The amount or content of social-network feedback or viewer feedback, if any, can be very useful criteria 408, e.g., only items 406 generally thought to be funny may be selected. In some embodiments, and for some other content-selection modules, the order and timing of the selections 406 made by the other content-selection modules may influence the selections of the first content-selection module 402.

While in some embodiments, the content-selection criteria 408 can be embodied in a simple look-up table, a more sophisticated first content-selection module 402 can embody its content-selection criteria 408 in an analytic model that applies known techniques of machine learning to constantly learn and to improve the selection process.

In step 306, the first content-selection module 402 uses its updated content-selection criteria 408 to prepare its output stream of secondary content items 406. The preparation can include selecting appropriate content items 406 and adding them to the content items selected by the other content-selection modules. There are other possibilities for preparing. Duplicate selections may be made by the set of content-selection modules, so preparing can include removing the duplicates. In some situations, the first content-selection module 402 can find a secondary content item 406 that it believes to be "better" (in some sense) than an item 406 already selected by another content-selection module. In this case, the first content-selection module 402 may replace the other's selection with its own in the output stream.

Preparation may also be based on aspects of the potential stream of selected secondary content items 406 itself. The first content-selection module 402 may choose to alter the timing, pace, and volume of the output stream so as not to overwhelm (or not to bore) the user, or it may change the order of items 406 in the stream. For example, the first content-selection module 402 may analyze the primary content item currently being viewed. Based on this analysis, it may, for example, decide that the user should not be distracted during the current scene of the primary content item. Thus, the first content-selection module 402 may completely stop the stream of secondary content items 406 for a while. Similarly, profile and status information of the viewer (including, for example, behavioral observations, policies, demographics, and peer-presence information) can be reviewed to decide whether and how often to present secondary content items 406.

In some embodiments, the preparation of step 306 can include modifying a selected secondary content item 406 or even creating a new one. For example, the first content-selection module 402 may believe that a secondary content item 406 is relevant but is too long to hold the user's interest. The selected item 406 can be edited down, trimmed, or a substitute found, for example a review or summary of the item 406 posted on the web. In another example, rather than selecting and presenting numerous social-networking posts, the first content-selection module 402 can create a summary of all of the posted comments and present that summary to the user.

Finally, in step 308, the output of the first content-selection module 402 is presented. If, for example, the first content-selection module 402 is embodied as a process running on an end-user device, then the presentation of step 308 can include streaming the selected secondary content items 406 to a display screen of the user device. Otherwise, the presenting can include sending the stream to another device for viewing by the user. Also, if the second content-selection module 404 is producing content that requires significant user attention, then the first content-selection module 402 may reduce the number of items it produces, delay some items that require more user attention, or try to produce items that do not require significant user attention.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method for providing secondary content to accompany a primary content item, the method comprising:
   receiving, by a first content-selection module, information associated with a first secondary content item, the associated information comprising a result of a selection process performed by a second content-selection module distinct from the first content-selection module, the selection process using a first media analysis of one or more of closed caption information, video images, and accompanying audio of the primary content;
   analyzing, by the first content-selection module, the associated information, wherein the analyzing comprises machine learning of one or more content-selection criteria associated with selection by the second content-selection module of the first secondary content item, and wherein a result of the analyzing is based, at least in part, on the result of the selection process performed by the second content-selection module;
   based, at least in part, on the analyzing, modifying, by the first content-selection module, a set of content-selection criteria for secondary content, wherein the modified set of content-selection criteria is based at least in part on a second media analysis of one or more of closed caption information, video images, and accompanying audio of the first secondary content item;
   based, at least in part, on the modified set of content-selection criteria, preparing, by the first content-selection module, a stream of second secondary content items; and
   presenting the stream of second secondary content items.

2. The method of claim 1 wherein the primary content item is selected from the group consisting of: a movie, a television program, a segment of video, and a music video.

3. The method of claim 1 wherein the first and second secondary content items are selected from the group consisting of: a movie, a television program, a radio program, a segment of video, a segment of audio, a song, a music video, an eBook, a game display, a map, a menu, a personal message, a public-service message, a service alert, an advertisement, a health-service recommendation, a web page, an e-mail message, a text message, a telephone call, a purchase recommendation, a routing recommendation, an application, a widget, metadata, and image, a graphic, an icon, a document, and a social-networking post.

4. The method of claim 1 wherein the first content-selection module is hosted by a device selected from the group consisting of: a set-top box, a personal communications device, a television, a mobile telephone, a personal digital assistant, a personal computer, an electronic picture frame, a tablet computer, a gaming console, a media-restreaming device, a head-end server, a server, and a plurality of servers.

5. The method of claim 4 wherein the first and second content-selection modules are hosted by the same device.

6. The method of claim 4 wherein the first and second content-selection modules are hosted by distinct devices.

7. The method of claim 1 wherein the information associated with the first secondary content item comprises an element selected from the group consisting of: the first secondary content item and metadata associated with the first secondary content item.

8. The method of claim 1 wherein the set of content-selection criteria comprises an element selected from the group consisting of: genre, sentiment, source, author, rating, popularity, date, size, social-network feedback, user feedback, order of secondary content items selected by the second content-selection module, and timing of secondary content items selected by the second content-selection module.

9. The method of claim 1 wherein modifying the set of content-selection criteria comprises updating a content-selection model, the content-selection model based, at least in part, on analyzing information associated with a plurality of secondary content items selected by the second content-selection module.

10. The method of claim 1 wherein preparing is further based on analyzing the primary content item.

11. The method of claim 1 wherein preparing is further based on analyzing a profile of a user.

12. The method of claim 11 wherein the profile information comprises an element selected from the group consisting of: an explicit setting by the user, a history of interactions of the user, a policy, information of activities of the user, a preference of the user, demographics of the user, and peer-presence information.

13. The method of claim 1 wherein preparing comprises an element selected from the group consisting of: searching for a second secondary content item, requesting a second secondary content item, filtering a stream of second secondary content items, accessing a database, accessing a user's digital video recorder, and accessing the Internet.

14. The method of claim 1 wherein the stream of second secondary content items comprises the first secondary content item.

15. The method of claim 1 wherein the stream of second secondary content items is empty.

16. The method of claim 1 wherein preparing comprises modifying a second secondary content item.

17. The method of claim 1 wherein preparing comprises creating a second secondary content item for the stream.

18. The method of claim 1 wherein preparing comprises setting a characteristic of the stream of second secondary content items, the characteristic selected from the group consisting of: an order of second secondary content items in the stream, timing of second secondary content items in the stream, volume of second secondary content items in the stream, and pacing of second secondary content items in the stream.

19. The method of claim 1 wherein presenting comprises displaying the stream of second secondary content items via a display interface of a device that hosts the first content-selection module.

20. The method of claim 1 wherein presenting comprises sending the stream of second secondary content items to a device distinct from a device that hosts the first content-selection module.

21. An electronic device configured for providing secondary content to accompany a primary content item, the electronic device comprising:
  a communications interface; and
  a processor operatively connected to the communications interface and configured for:
    providing a first content-selection module, the first content-selection module configured for receiving, via the communications interface, information associated with a first secondary content item, the associated information comprising a result of a selection process performed by a second content-selection module distinct from the first content-selection module, the selection process using a first media analysis of one or more of closed caption information, video images, and accompanying audio of the primary content;
    analyzing, by the first content-selection module, the associated information, wherein the analyzing comprises machine learning of one or more content-selection criteria associated with selection by the second content-selection module of the first secondary content item, and wherein a result of the analyzing is based, at least in part, on the result of the selection process performed by the second content-selection module;
    based, at least in part, on the analyzing, modifying, by the first content-selection module, a set of content-selection criteria for secondary content, wherein the modified set of content-selection criteria is based at least in part on a second media analysis of one or more of closed caption information, video images, and accompanying audio of the first secondary content item;
    based, at least in part, on the modified set of content-selection criteria, preparing, by the first content-selection module, a stream of second secondary content items; and
    presenting, via the communications interface, the stream of second secondary content items.

22. The electronic device of claim 21 wherein the electronic device is selected from the group consisting of: a set-top box, a personal communications device, a television, a mobile telephone, a personal digital assistant, a personal computer, an electronic picture frame, a tablet computer, a gaming console, a media-restreaming device, a head-end server, a server, and a plurality of servers.

23. The electronic device of claim 21 wherein the electronic device hosts the second content-selection module.

24. The electronic device of claim 21 wherein the second content-selection module is hosted by a device distinct from the electronic device.

25. The electronic device of claim 21 wherein presenting comprises displaying the stream of second secondary content items via a display interface of the electronic device.

26. The electronic device of claim 21 wherein presenting comprises sending the stream of second secondary content items to a device distinct from the electronic device.

27. The electronic device of claim 21 wherein the content-selection criteria comprise one or more of: a sentiment of the secondary content item, a source of the secondary content item, an author of the secondary content item, a rating of the secondary content item, a popularity of the secondary content item, a creation date of the secondary content item, a size of the secondary content item, an amount of social-network feedback or viewer feedback for the secondary content item, and a content of social-network feedback or viewer feedback for the secondary content item.

28. The method of claim 1 wherein the content-selection criteria comprise one or more of: a sentiment of the secondary content item, a source of the secondary content item, an author of the secondary content item, a rating of the secondary content item, a popularity of the secondary content item, a creation date of the secondary content item, a size of the secondary content item, an amount of social-network feedback or viewer feedback for the secondary content item, and a content of social-network feedback or viewer feedback for the secondary content item.

* * * * *